United States Patent [19]
Sackett

[11] Patent Number: 4,768,305
[45] Date of Patent: Sep. 6, 1988

[54] ANIMAL TRAP

[76] Inventor: Robert L. Sackett, 2282 #43 Caminito Pescado, San Diego, Calif. 92107

[21] Appl. No.: 69,045

[22] Filed: Jul. 2, 1987

[51] Int. Cl.⁴ .......................................... A01M 23/02
[52] U.S. Cl. ...................................................... 43/61
[58] Field of Search ..................................... 43/61, 60

[56] References Cited

U.S. PATENT DOCUMENTS

| | | | |
|---|---|---|---|
| 1,226,641 | 5/1917 | Cushing | 43/60 |
| 1,240,248 | 9/1917 | Pease | 43/60 |
| 1,581,297 | 4/1926 | Schmuck | 43/60 |
| 2,485,319 | 10/1949 | Rosen | 43/61 |
| 2,885,820 | 5/1959 | Maggio | 43/61 |
| 3,823,504 | 7/1974 | Dosch | 43/61 |
| 4,550,523 | 11/1985 | Spiller | 43/61 |
| 4,550,524 | 11/1985 | Goebel | 43/75 |
| 4,566,218 | 1/1986 | Kurosawa | 43/61 |
| 4,578,892 | 4/1986 | Melton | 43/61 |

FOREIGN PATENT DOCUMENTS 17092 of 1891 United Kingdom ..................... 43/60

Primary Examiner—Gene P. Crosby
Attorney, Agent, or Firm—Frank D. Gilliam

[57] ABSTRACT

An animal trap suited for trapping rodents or the like is shown. The trap comprises a hollow housing with a closure for sealing a trapped animal therein. The normally open closure member operates to seal off the exit of the trapped animal when actuated. The closure is actuated from an open housing position to a sealed off housing position by pivoting the housing from an open end downward position about a fulcrum to an open end upward position. The pivoting of the housing is caused by travel of a small animal therein moving from the open end of the housing toward the closed opposite end to retrieve bait placed at the end opposite the open end.

5 Claims, 2 Drawing Sheets

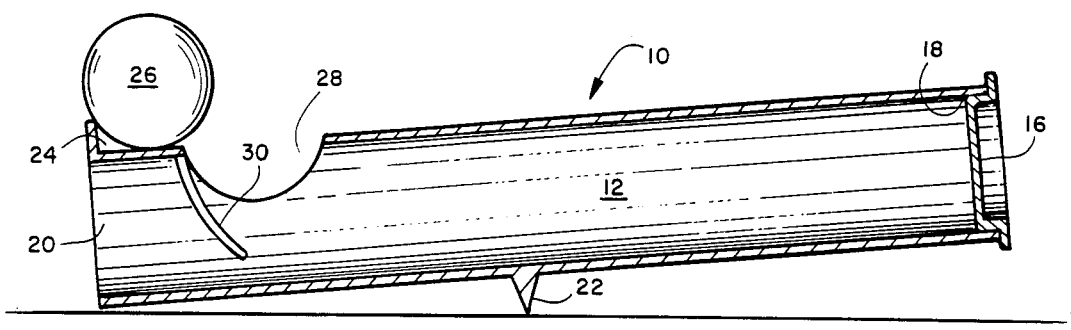
FIGURE 3
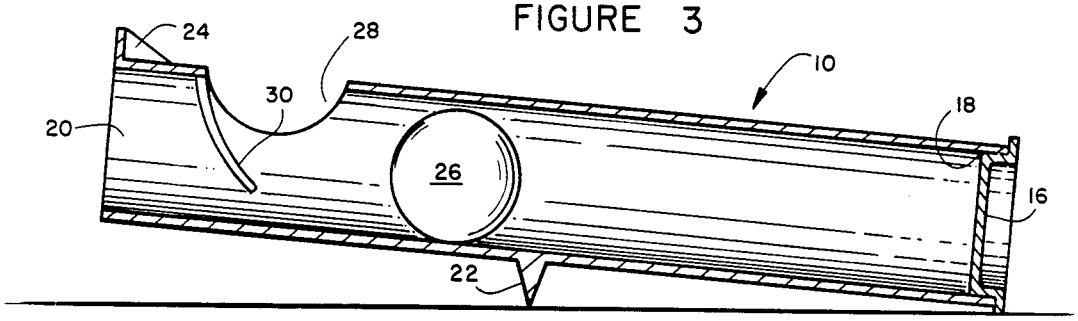
FIGURE 4
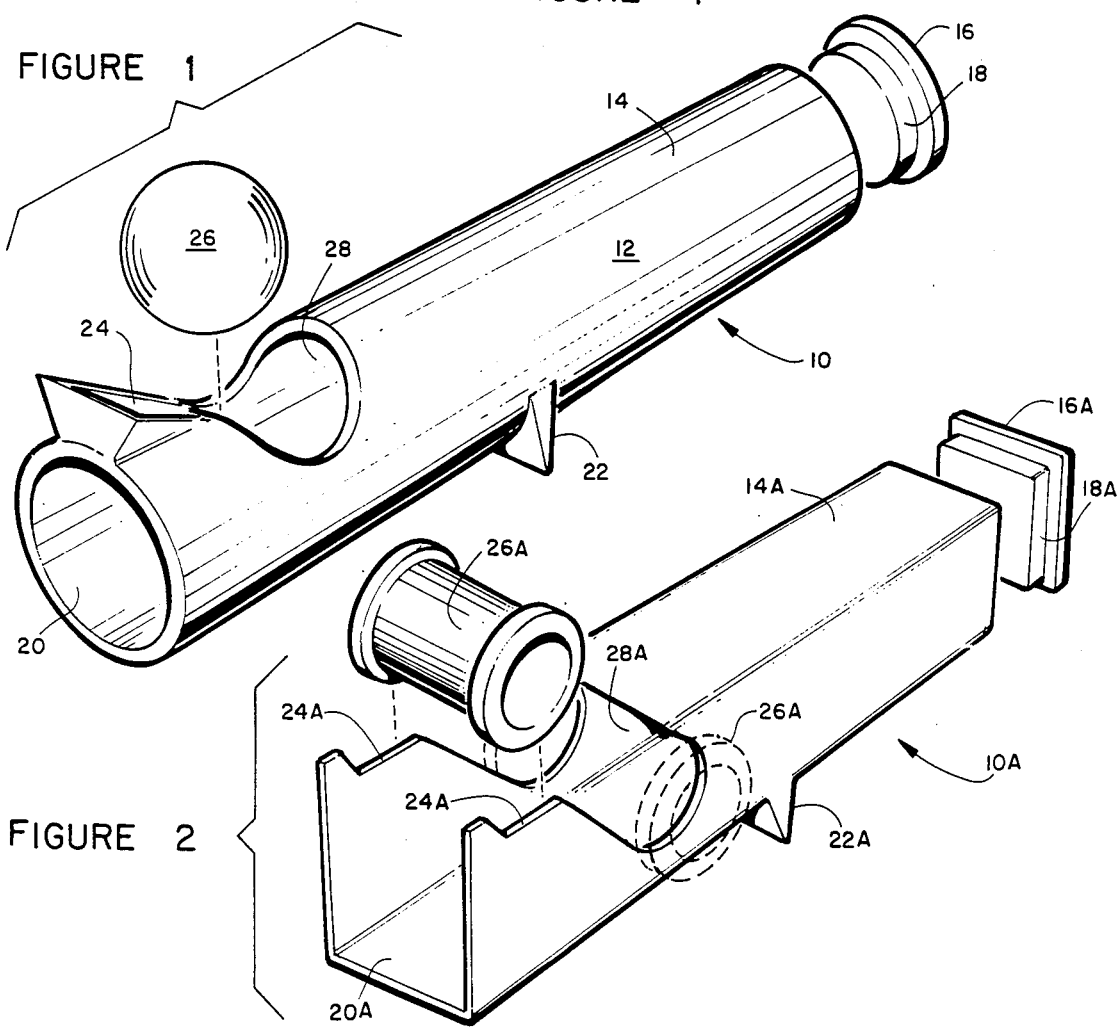
FIGURE 1
FIGURE 2

ANIMAL TRAP

BACKGROUND OF THE INVENTION

1. Field of the Invention

The present invention relates generally to animal traps and more specifically, to a trap particularly suitable for catching mice and other small rodents in a disposable container which may be re-used or readily discarded after its use without requiring exposure of the trapped rodent.

Improved traps of this type are found in U.S. Pat. Nos.: 4,550,523, 4,500,524, and 4,578,892.

U.S. Pat. No. 4,550,523 by Robert S. Spiller teaches a reusable or disposable rodent trap, having only two discrete parts, consisting of an unstable, tiltable enclosure, upon whose exterior surface is mounted on a rotating door member with elongated side panels, which is prevented from rotating whenever the entrance side of the enclosure is downwardly inclined. Contact between the elongated door side panels, and the surface upon which the downwardly inclined enclosure rests, provides the rotation impediment. A rodent traversing the length of the enclosure to reach bait at the closed end causes the enclosure to incline upwardly, allowing the door to rotate closed by gravity. The rodent's return to the entrance end causes the enclosure to again assume a downward inclination. Since the door cannot be rotated in either direction when the enclosure is downwardly inclined, the rodent, which will die of asphyxiation within hours, may be disposed of by simply inverting the trap.

U.S. Pat. No. 4,550,524 by Joseph A. Goebel teaches a rodent trap characterized by a rodent receiving chamber, a partition selectively movable across the chamber in a rodent eradicating relationship, a movable floor portion continually urged to an overlying position with respect to a rodent receiving tray, where the floor portion moves with the partition and cam action releases the floor portion to the aforesaid overlying position. A pressure sensitive switch holds the rodent bait and initiates sequential operation. The trap further employs a two-way solenoid for partition movement and a one-way gearing arrangement for selective floor portion position control.

U.S. Pat. No. 4,578,892 by Melvin M. Melton teaches an animal trap especially suited for trapping rodents such as mice or other small animals, comprising a disposable, elongated container having two contiguous bottom surfaces forming an obtuse angle therebetween and a hinged door for selectively enclosing the container after the animal has entered and sprung the trap. When set, the trap rests on a first of the two bottom surfaces with the door held elevated from the container to permit an animal to enter the trap. The second of the two bottom surfaces is elevated from the underlying support surface. When the animal enters the portion of the container where the bait is positioned, the animal's weight lowers the second bottom surface and elevates the first bottom surface releasing the door and closing the container trapping the animal. The door is sealed by magnetic force and/or a latch which hooks into an aperture in the first bottom surface. The trap is especially configured as an intergrate unit for low cost manufacture by means of molding or extruding various plastics.

The device covered by U.S. Pat. Nos. 4,550,523 and 4,578,892 teaches a door closure that must rotate toward the open end of the container for closure. For door closure in this manner, the surface in front of the open container must be substantially flat for the door to completely close. A trap of this type is not suitable for use out-of-doors where the supporting surface is not always flat, for example, on lawns, cement, brick pavers or similar terrain or in-door where long stranded or shag carpet is employed as a trap supporting surface.

It can be seen that the aforementioned prior art patents disclose animal traps which obviates the risk of injury to the user while setting the trap and each discloses a device which is designed to contain the trapped animal thereby removing the requirement for observing and/or cleaning up the traps long well known in the rodent trap art. Unfortunately, in overcoming these disadvantages, the patented devices result in additional disadvantages which render them commercially undesirable for providing substitutes for the inexpensive convention and spring load trap. For example, as noted above, the door of the cited prior art will not fully close when slight obstructions are in their door swing closure path allowing a rodent that has entered to fully exit the device. The door actuation mechanisms requires an expensive labor step for attachment. For continued use, the traps noted above would have a short life due to required mechanisms. The U.S. Pat. No. 4,550,524 device is extremely complex in manufacture and operation resulting in extreme cost and probable failure.

There has not been an entirely satisfactory devise for ease of manufacture and operation which will withstand continued use until the emergence of the present invention.

SUMMARY OF THE INVENTION

The present invention overcomes the aforementioned disadvantages of the prior art by providing a trap which can be manufactured with a minimum of costly labor steps and will operate successfully on uneven or rough surface as well as smooth surface. The trap of the invention can be formed from a simple length of tubular or rectangular material. The closure mechanism can be a simple sphere which rolls into the central portion of the container thereby trapping the rodent therein; a rectangular guillotine wall which falls under gravity into slots through the housing to trap the rodent therein; or a spool which rolls into deep slots in the side of the housing blocking the exit of a rodent therein. It is the intent of this invention to provide the proverbial better mouse trap.

It is an object of the invention to substantially reduce or entirely overcome the noted disadvantages of conventional traps which is of a low cost configuration and, therefore, commercially more attractive than the current devices.

It is a further object of the invention to provide a small animal trap of which is suitable for low cost plastic molding manufacture or manufactured by other comparable low cost techniques.

The aforementioned objects and advantages of the present invention as well as additional objects and advantages thereof, will be more fully understood hereinafter as a result of the detailed description of preferred embodiments of the invention taken in conjunction with the following drawings in which:

BRIEF DESCRIPTION OF THE DRAWINGS

FIG. 1 is an elevated perspective view of a first embodiment of the invention;

FIG. 2 a side cutaway showing of the embodiment of FIG. 1 in a set-to-catch configuration;

FIG. 3 is a view similar to FIG. 2 showing the trap in a sprung configuration;

FIG. 4 is a second embodiment of the invention showing the spool in the set-to-catch position and in the spring position in phantom;

DETAILED DESCRIPTION OF THE PREFERRED EMBODIMENTS

Figure 6:
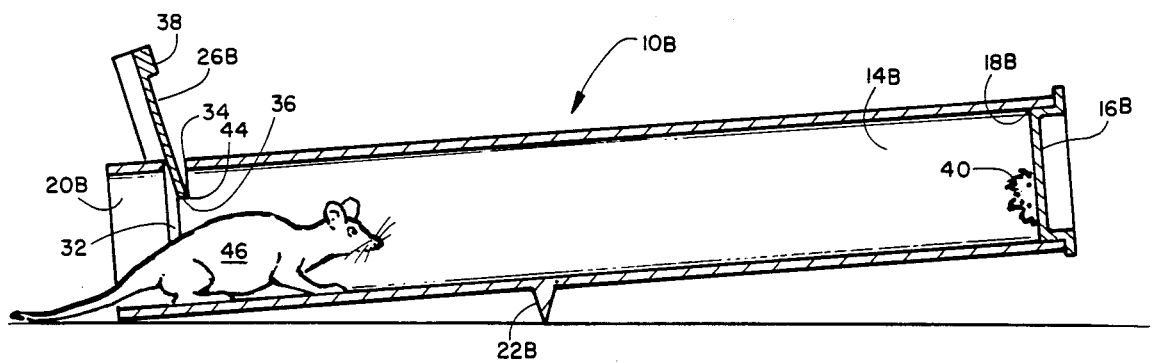
FIG. 6 is a side showing of the embodiment of FIG. 5 in the set-to-catch configuration.

Referring now specifically to drawings FIGS. 1-3 which depict the first embodiment of the invention. The housing 12 of the trap 10 is tubular in cross-section. One end 14 has a removable wall portion 16 with a sealing ridge 18 which functionally secures into the end 14. The wall position 16 is removable and reinsertable for the purpose of placing bait to lure the small animal into the housing and toward the end of the housing opposite normal open end 20. Along a bottom surface or bottom plane of the housing is positioned a fulcrum 22 across or transverse to the longitudinal length of the housing. The location of the fulcrum is generally slightly forward of the longitudinal center of the housing. The placement of the fulcrum is chosen so as to provide a housing slant position as shown in FIG. 2 when the trap is set to catch a small animal and to tip to the slant position of FIG. 3 when a rodent proceeds in the housing toward removable wall portion 16. On the end 20 of the housing 12 exterior thereof is a pedestal 24 for placement of a sphere the ball closure member 26 when the trap is in the set-to-catch position as shown in FIG. 2.

Along the inside of the housing 12 adjacent to a housing opening 28 is a rim or ridge 30 which slightly extends toward the longitudinal center line of the housing whereby the sphere closure member 26 which is sized to easily roll within the housing and yet be contained therein by the removable wall position 16 and the internal rim or ridge 30.

As can be readily seen from the drawing FIGS. 1-3, the trap is set by placement of the ball closure member on the pedestal 24 where the location of the fulcrum and the weight of the sphere closure member maintain the trap in the FIG. 2 slanted position. As a small animal enters through housing open end 20 and proceeds to travel towards the bait at end 14 of the housing, the weight of the animal at a certain position between the fulcrum and the housing end 14 (see FIG. 8) will cause the housing to rotate about the fulcrum to the FIG. 2 slant position causing the sphere closure member 26 to the roll from the pedestal 24 position through the housing opening 28 and into the interior thereof trapping the animal within the housing. Because of the friction fit of the removable wall portion 16 and the rim or ridge 30, the animal is confined within the housing. To remove the animal therefrom either the removable wall 16 can be removed or the trap can be rotated 180° and the sphere closure member extracted therefrom through housing opening 28. The trap can be discarded with the animal trapped therein if so desired, as the cost of the trap is minimal. The housing and removable end closure can be formed from plastic or the like and the sphere closure member can be constructed of the same or similar material as the housing and the removable end wall or can be a glass sphere such as a marble, a resilent ball such as a golf ball or the like or any other sphere suitable for the pupose intended. Referring now to FIG. 4, a second embodiment of the trap 10A is shown. Corresponding portions of this embodiment similar to portions of the first embodiment are identified with the same numeral followed with the letter "A". The housing 12A is rectangular in cross-section rather than tubular as shown is the first embodiment. The pedestal 24 is replaced by a pair of cut-outs 24A which form a two part pedestal for support of a closure member 26A which is in the form of a spool.

The operation of the second embodiment is the same as the first embodiment, namely, as the small animal enters the trap through open wall 20A and proceeds toward removable end 16A, the housing tips from a position shown in FIG. 2 to the position shown in FIG. 3 whereby the spool closure member 26A rolls off of pedestals 24A into housing opening 28A closing of the only path of exit for the animal therein. The animal can be removed therefrom in the same or similar manner as explained above. The spool closure 26A may be hollow as shown or solid and may be constructed if any material suitable for the purpose intended.

Referring now specifically to FIGS. 5-8 which depict a third embodiment of the trap 10B. Elements similar in purpose to the elements of FIGS. 1 and 4 are denoted with the same numeral designator with the addition of the letter "B".

The third embodiment includes a slot 32 extending from the top surface of the housing 12B to substantial the bottom surface of the housing. A notch 34 is included having an increased width deferred by the length of surface 36. The upper portion 38 of the closure 26B carrier an increased thickness. This serves as added weight to close the closure and to form a lock fit with the notch 34.

In operation, the trap is baited with bait 40 attached to the removable wall 16B and the door closure member 26B is elevated to a position shown in FIG. 6. To maintain the door closure in this position, the bottom edge 42 is held by the corner 44 formed between the wall of the slot and surface 36.

Figure 7:
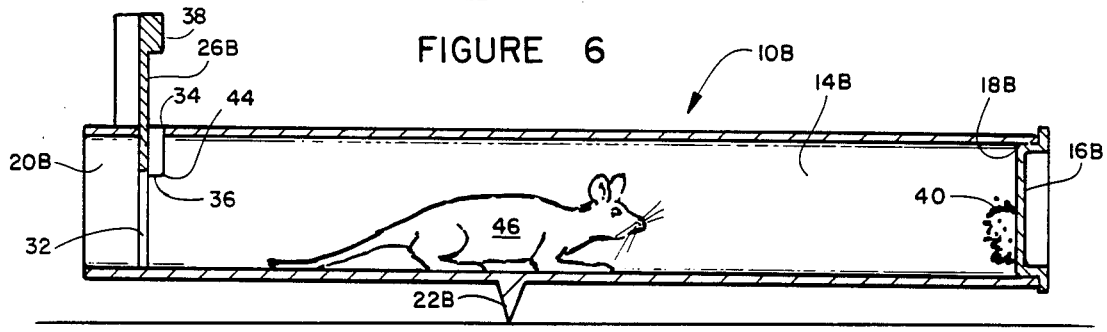
FIG. 7 is a side showing similar to FIG. 6 with an animal to be trapped proceeding toward the closed end thereof prior to trapping.
Figure 8:
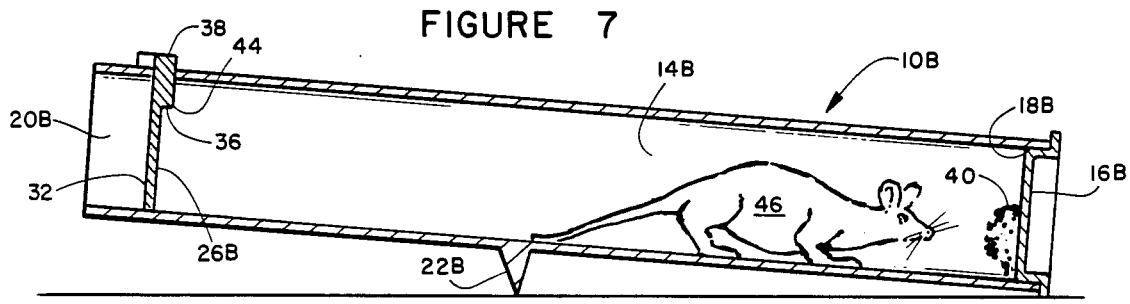
FIG. 8 is a side showing similar to FIG. 6 and 7 with the trap sprung.
Figure 5:
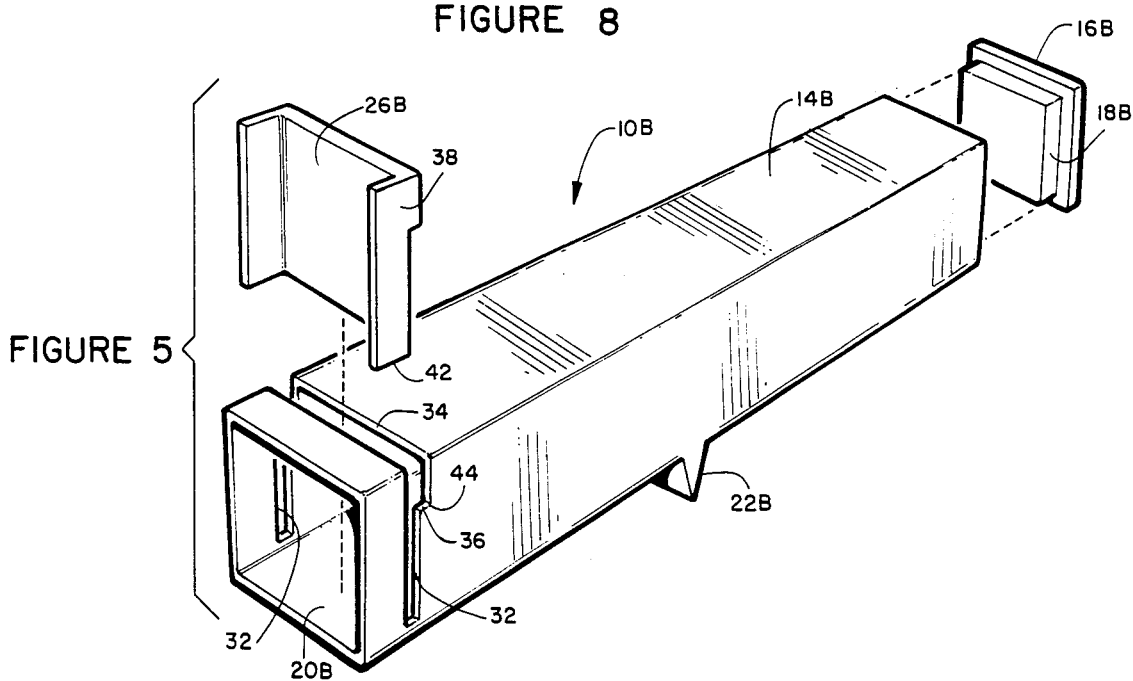
FIG. 5 is a third embodiment of the trap of the invention shown in perspective with the trap door in an exploded aligned position.

When the animal 46 enters the housing 14B through open end 20B and proceeds past the fulcrum 22B, the housing tilts from the FIG. 6 position to the FIG. 7 position. As the animal 46 continues to travel toward bait 40, the housing tips from the FIG. 7 substantial balance to the tiped position of FIG. 8. When in the FIG. 8 position the bottom 42 of the door closure 26B rotates out of the corner 44 and the door closure translates down slot 32 do to gravity acting therein. In the FIG. 8 showing, the animal 46 is then trapped within the housing 14B.

The animal can then be released or the trap and animal can be discarded as hereinbefore mentioned.

From the preceeding, it should be evident that the animal traps presented herein are effective in operation, as in the luring and trapping of animals. The traps are susceptible, or course, to changes, in proportioning and the selection of material for fabrication. Thus, the of proceeding descriptions of the preferred embodiments should be considered illustrative and not limiting the scope of the invention. Accordingly, all such modifications are deemed to be within the scope of the present invention which is to be limited only by claims opened hereto.

What is claimed is:

1. An animal trap comprising:
   a container having a first open end for permitting entry of an animal to be trapped to the interior of said container and a second closed end, said container having bottom, top and side surfaces, at least said bottom surface extending along a single plane, a fulcrum located intermediate said open end and closed end on the exterior of said bottom surface so that in a set-to-trap condition said container inclines upwardly from said open end towards said closed end and when an animal travels along said interior of said container between said fulcrum and said closed end, said container rotates about said fulcrum and inclines downward from said open end towards said closed end;
   a selectively removable closure means movable from a set-to-trap position substantially above said top surface wherein said open end remains open for access to the interior of said container to a position closing said open end of said container from entry into or exit from the interior thereof, said closure means tranlates downwardly when said container rotates about said fulcrum; and
   a slot extending through the upper and side surfaces of said container towards the bottom surface thereof, said slot having an enlarged dimension along the top surface toward said closed end thereof which extends a short distance toward said bottom surface and said closure means includes an enlarged upper dimension adapted to fit into the enlarged dimension portion of said slot when closing the open end of said container, the lower surface of said enlarged dimension of said slot captures the lower surface of said closure means when said trap is in said set-to-trap condition, said lower surface of said closure means is caused to rotate towards said open end of said container out of contact with the lower surface of said slot when said open end of said container rotates upwardly toward said closed end, causing said closure means to translate downwardly closing off the open end of said container.

2. The invention as defined in claim 1 wherein said container is rectangular in cross-section.

3. The invention as defined in claim 1 wherein said fulcrum extends across the bottom surface of said container a distance substantially equal to the maximum width of said container.

4. The invention as defined in claim 1 wherein said closed end includes a wall portion which can be selectively removed and replaced for placement of bait within the interior of said trap, said wall portion includes a ridge which functionally secures said wall portion within the opening of the normally closed container end.

5. The invention as defined in claim 1 wherein said closure means is a thin door.

* * * * *